Sept. 12, 1950 W. C. SILVA 2,522,308
CELERY HARVESTING MACHINE
Filed Jan. 27, 1948 6 Sheets-Sheet 1

Inventor
WILLARD C. SILVA
By Mason, Fenwick & Lawrence
Attorneys

Sept. 12, 1950 W. C. SILVA 2,522,308
CELERY HARVESTING MACHINE
Filed Jan. 27, 1948 6 Sheets-Sheet 2
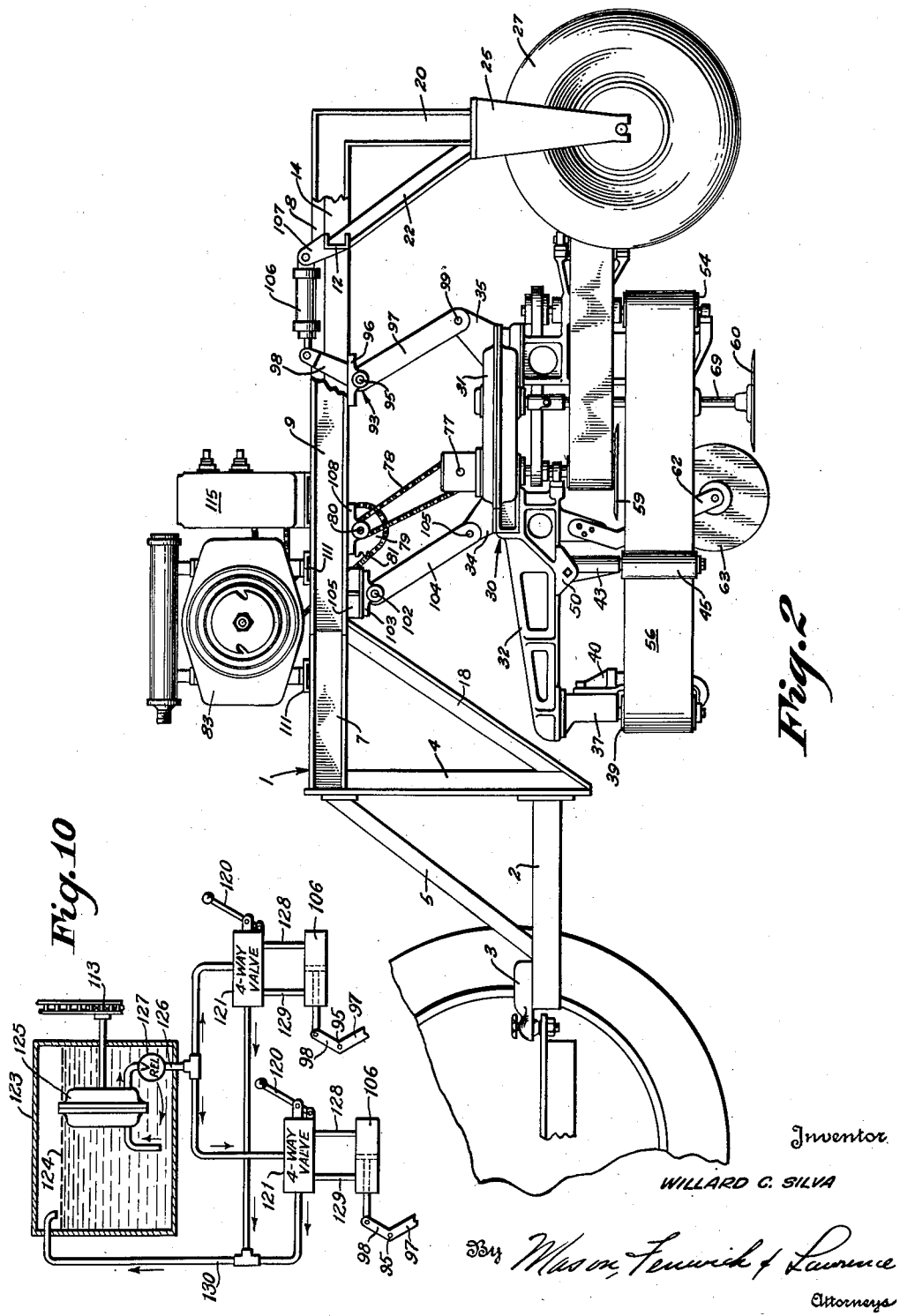
Inventor
WILLARD C. SILVA
By Mason, Fenwick & Lawrence
Attorneys Sept. 12, 1950 W. C. SILVA 2,522,308
CELERY HARVESTING MACHINE
Filed Jan. 27, 1948 6 Sheets-Sheet 3

Inventor
WILLARD C. SILVA
Mason, Fenwick & Lawrence
Attorneys

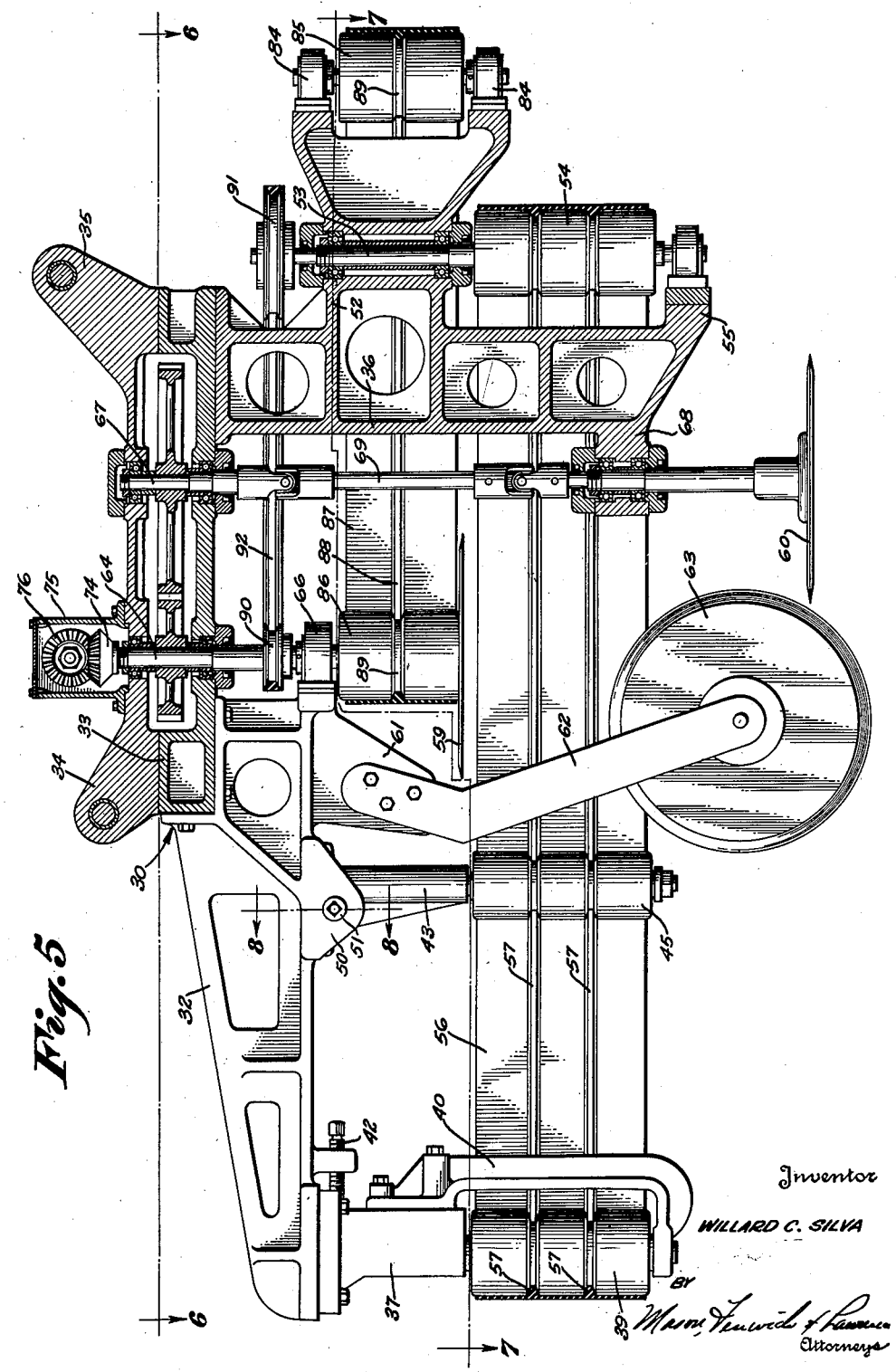

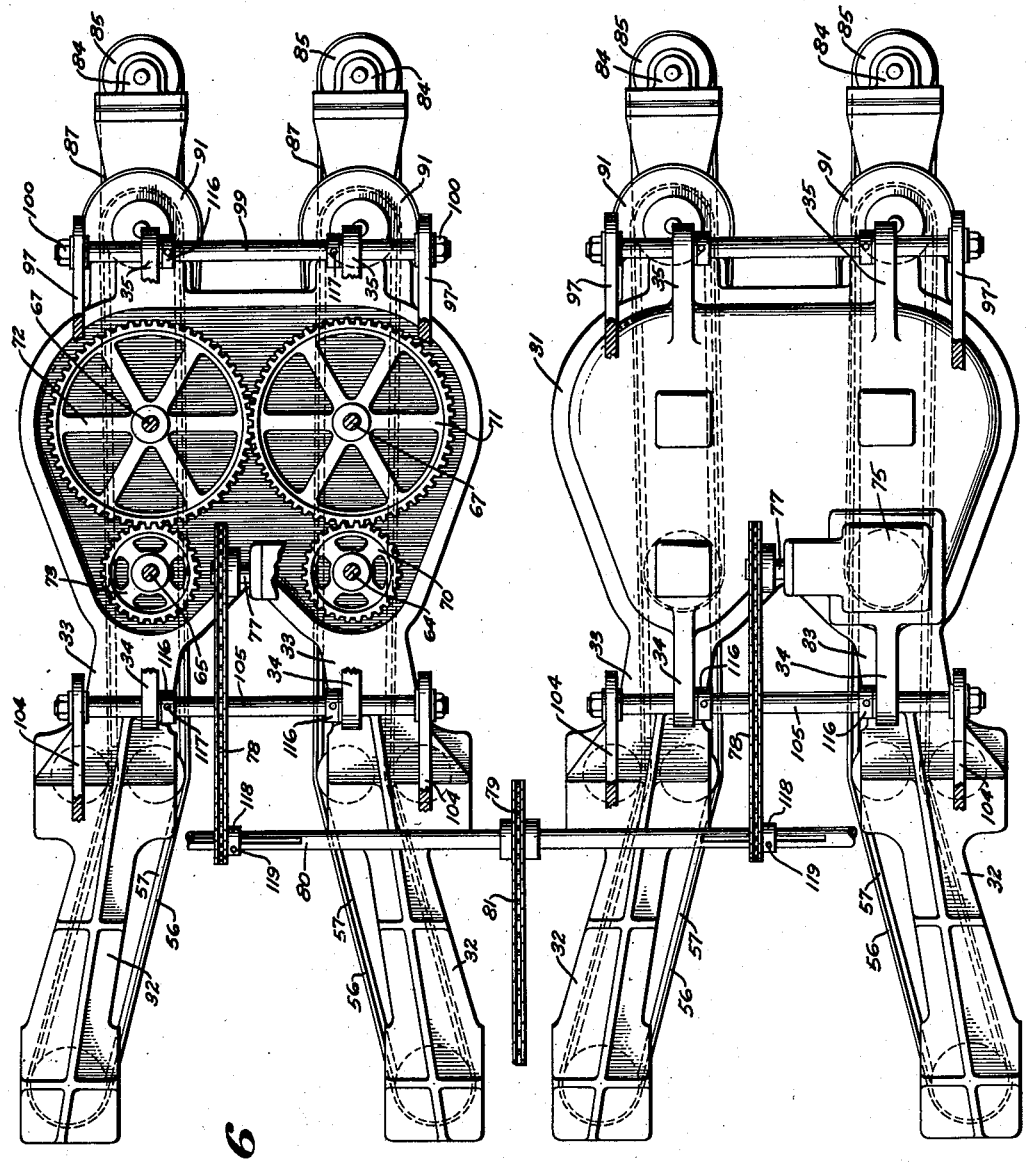

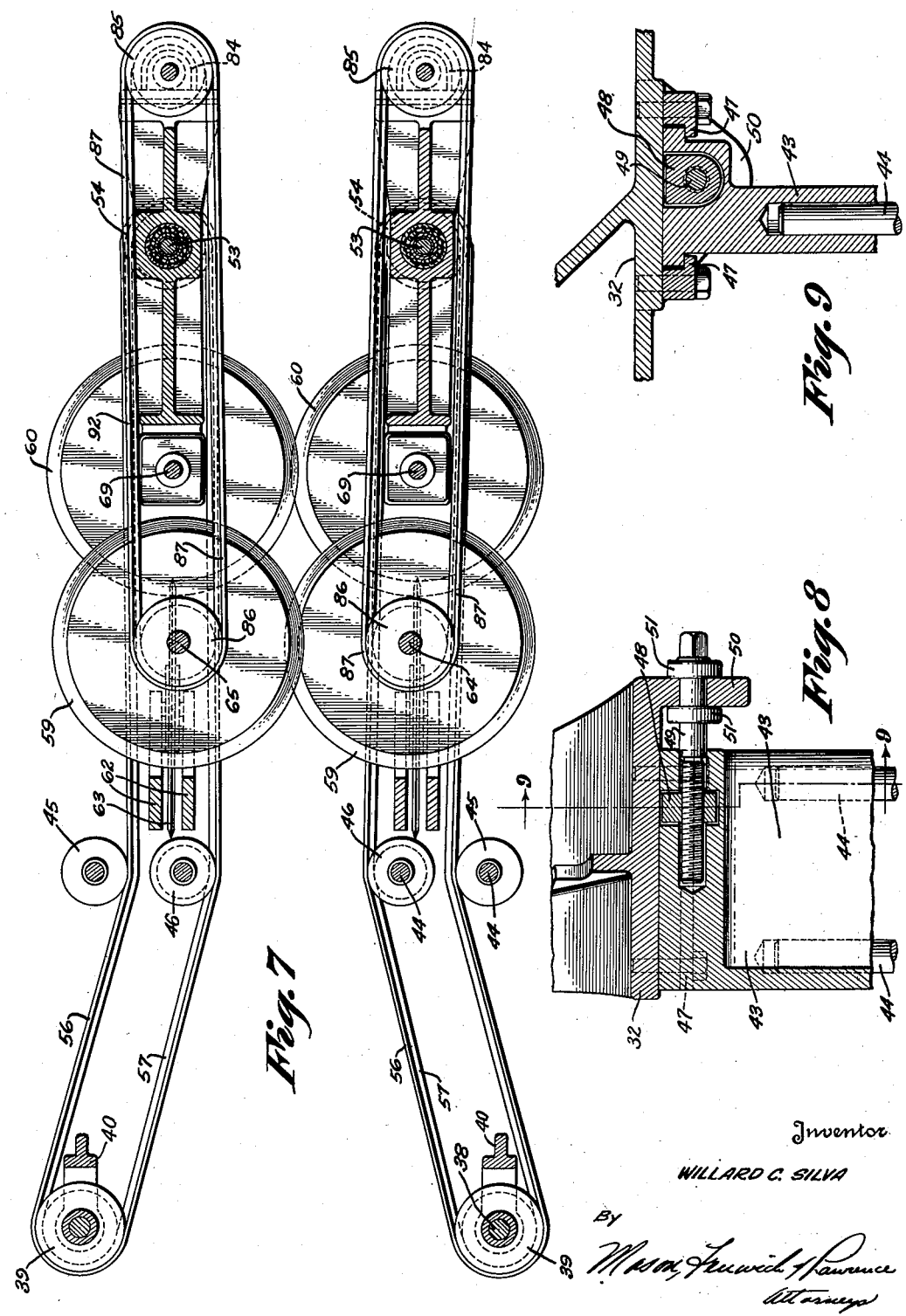

Patented Sept. 12, 1950

2,522,308

UNITED STATES PATENT OFFICE 2,522,308

CELERY HARVESTING MACHINE

Willard C. Silva, Sarasota, Fla.

Application January 27, 1948, Serial No. 4,479

18 Claims. (Cl. 55—108)

This invention relates to celery harvesters, and is an improved structural embodiment of the principles of the invention covered in my copending application Ser. No. 535,729, filed May 15, 1944, now Patent 2,436,831, issued March 2, 1948.

Briefly stated, the celery harvester of said earlier filed application is a field machine for cutting off the roots and tops of standing celery, thus reducing the stalk length to the uniform dimensions of a standard crate, adapted to be drawn longitudinally astride a row of standing celery, having the top cutting means ahead of the root cutting means so that the tops are cut while the plants are still rooted, having forwardly divergent rearwardly moving belt flights embracing the foliage portion of the plant to compact the foliage as it approaches the top cutting means, and providing vertical adjustment of root and top cutting means as a unit, whereby the roots may be cut at high or low level without changing the vertical distance between the planes of the root and top cutting means, thus maintaining constant the length of the trimmed stalk.

The present invention has for one of its objects the provision of a wheeled vehicle adapted to be tractor drawn, having one or more harvesting units suspended therebeneath, capable of being raised or lowered as a unit relative to said vehicle for adjusting the cutting depth of the root cutter, while at the same time maintaining a fixed distance between the planes of the root and top cutters, the driving power for the various moving instrumentalities associated with the harvesting unit being derived from a small engine carried by the vehicle. This makes it possible to provide a comparatively light weight harvester and also to run the cutters and belt means at an optimum speed independent of the speed of the tractor.

Another object of the invention is to provide a multi-unit celery harvester capable of simultaneously harvesting the celery from several adjacent parallel rows.

Still another object of the invention is to provide a multi-unit machine in which the units are laterally adjustable to suit the spacing between adjacent rows.

A further object of the invention is to construct a celery harvester in which the depth adjustment of the harvesting unit is effected hydraulically, and when more than one unit is employed, to provide a construction in which the depth adjustment may be independent for each unit.

Another object of the invention is the provision of a celery harvester of the type described, provided with conveyor means having its anterior end adjacent the point at which the tops are severed, and extending to the rear of the machine whereby the tops, which when later dehydrated have a large value as an ingredient of poultry feed, are conserved and carried to the rear where they may be delivered to a collecting means instead of being let drop upon the field.

Other objects of the invention will appear as the following description of a preferred and practical embodiment thereof proceeds.

In the drawings which accompany and form a part of the specification, and throughout the several figures of which the same reference numerals refer to identical parts:

Figure 2 is a side elevation, part being broken away to reveal details that would be otherwise hidden;

Figure 5 is a side view, in vertical section, of a harvesting unit;

Figure 6 is a top view of two correlated harvesting units, the upper one being sectioned in a horizontal plane along the line 6—6 of Figure 5, the lower unit being in plan;

Figure 7 is a horizontal section, taken along the line 7—7 of Figure 5;

Figure 8 is a vertical section taken along the line 8—8 of Figure 5;

Figure 9 is a vertical section taken along the line 9—9 of Figure 8;

Figure 10 is a diagrammatic view illustrating the hydraulic system.

Figure 1:
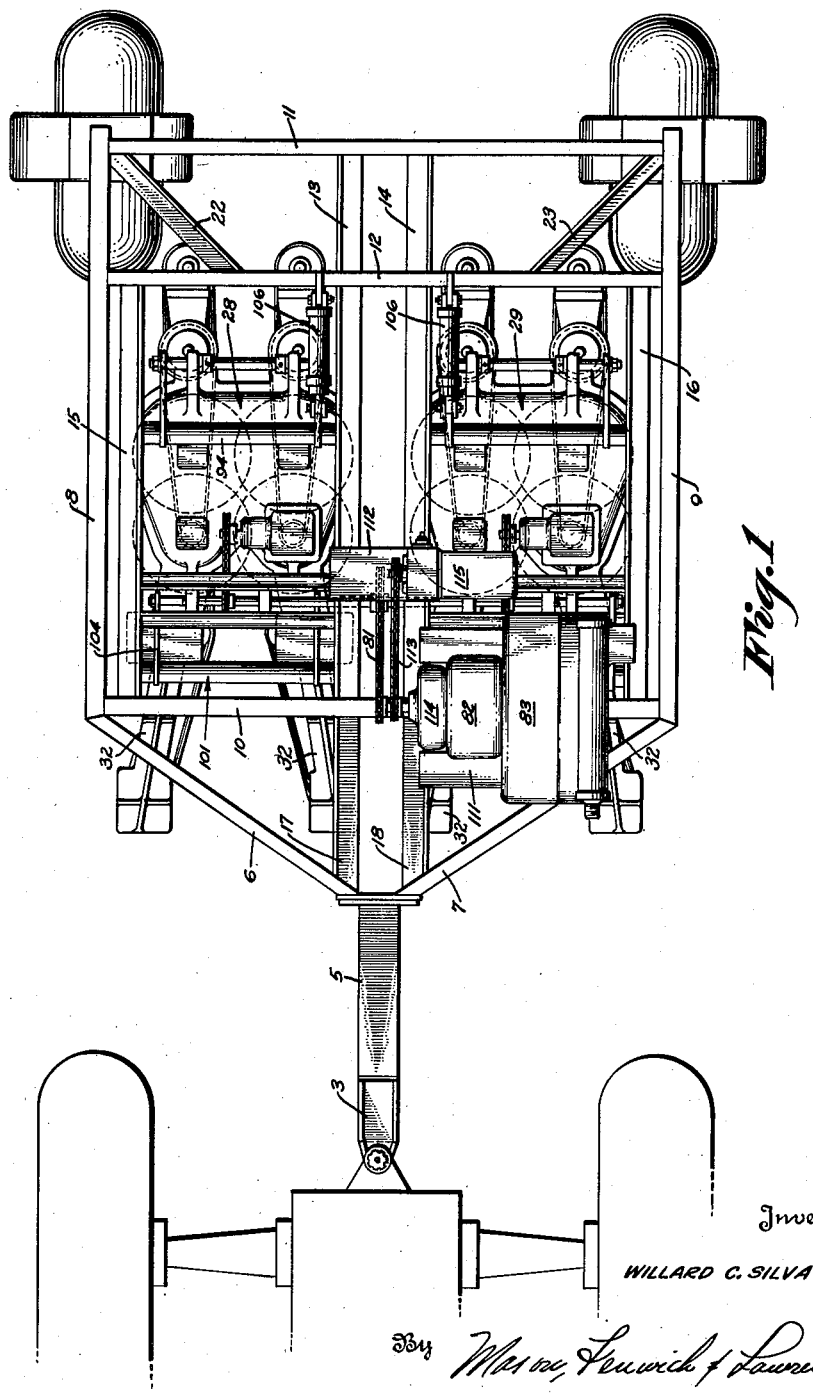
Figure 1 is a plan view of a celery harvester embodying the principles of the invention.

Referring now in detail to the several figures, the frame, which in general is designated by the numeral 1, comprises a draw bar 2 in the medial longitudinal vertical plane of the harvester, having a tractor coupling 3 at its forward end, and a vertical stem 4, also in said medial plane, secured to the rear end of the draw bar and extending upwardly perpendicular thereto. A diagonal brace 5 joins the forward part of the draw bar and the upper part of the stem. From the rear of the upper end portion of the stem 4, frame members 6 and 7 diverge outwardly and rearwardly in a horizontal plane symmetrically with respect to said medial vertical plane, being of equal length. Parallel longitudinal outer frame members 8 and 9 are rigidly connected to the outer ends of the divergent frame members 7 and 8, being of the same length and connected transversely at their corresponding ends by bridging frame members 10 and 11. There is an intermediate transverse frame member 12 toward the rear of the frame 1, rigidly joined to the outer frame members.

Inner longitudinal frame members 13 and 14, slightly spaced apart, symmetrical with said medial plane, extend between the transverse members 10 and 11, and are rigidly joined thereto and to the transverse frame member 12. Lateral frame members 15 and 16, slightly spaced from the outer frame members 8 and 9 and parallel thereto, extend between the transverse frame members 10 and 11, being secured thereto. Inclined parallel braces 18 and 19 extend upward and rearward from the lower end of the stem 4 to the forward ends of the inner longitudinal members 13 and 14, being rigidly secured to the stem, to said inner longitudinal members, and to the transverse member 10. All of the frame members from 6 to 16, inclusive, are substantially in a common horizontal plane.

From the rear ends of the frame members 8 and 9 vertical legs 19 and 20 depend, these being rigidly tied by a transverse member 21, extending between their lower ends. Inclined braces 22 and 23 extend from the end portions of the transverse member 21 in a forward direction to intermediate portions of the transverse member 12, to which they are rigidly secured.

To the lower ends of the legs 19 and 20 and the adjacent end portions of the transverse member 21, the forks 24 and 25 are secured, said forks supporting the axles of the vehicle wheels 26 and 27 and embracing said wheels.

The above completes a description of the frame, the precise construction of which is not critical to the invention. It will be observed from Figure 1 that the frame members 13 and 15 and 14 and 16, together with the transverse frame members 10 and 12, define laterally related rectangular spaces, beneath which the respective harvesting units 28 and 29 are suspended.

The harvesting units 28 and 29 are identical. Each comprises a frame 30, the plan shape of which can be comprehended from Figure 6 and the side elevational shape from Figure 2. The frame 30 comprises a gear case 31, to the forward end of which divergent booms are secured, as shown in Figure 5, the gear case having forward extensions 33 with plane perpendicular front and bottom faces which fit against corresponding faces formed on the booms, and being bolted thereto.

Figures 3, 4:
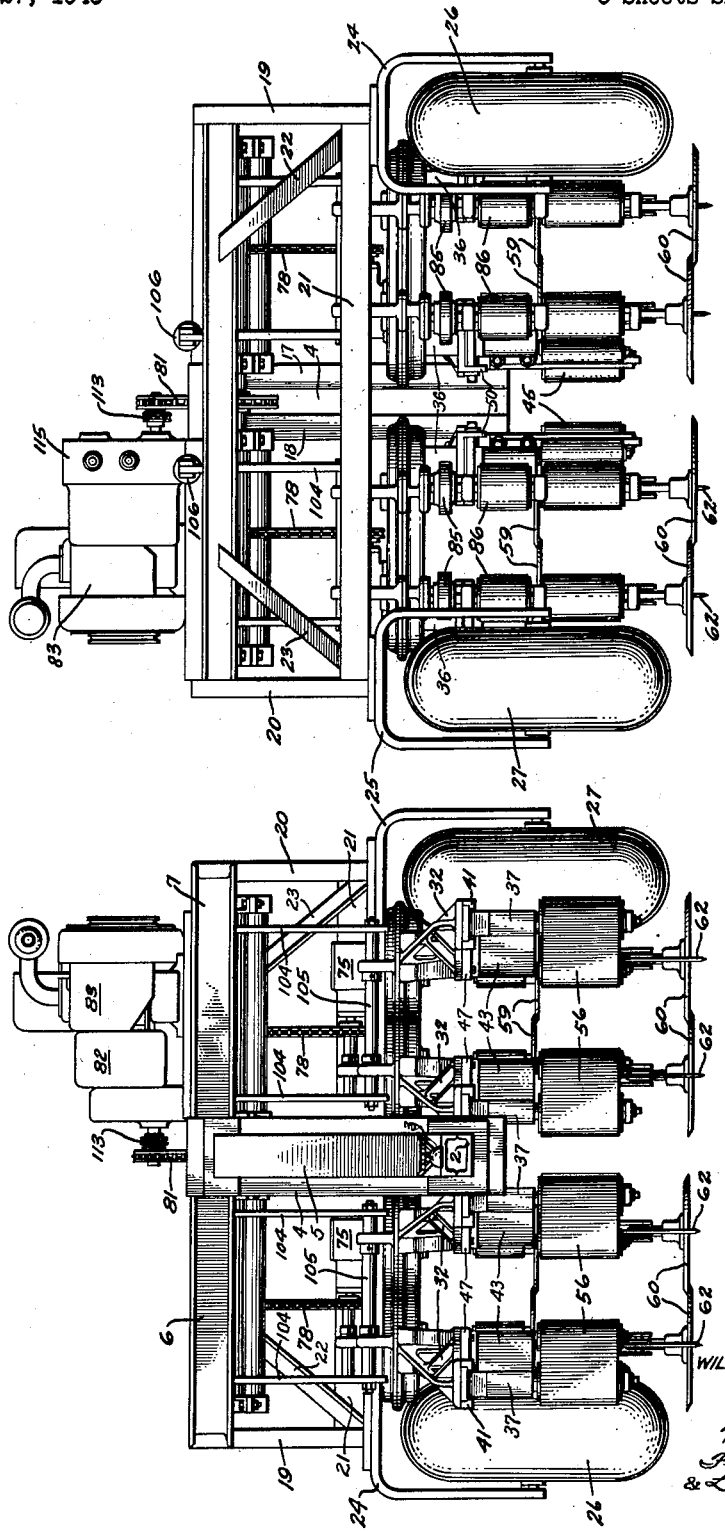
Figure 3 is a front elevation.
Figure 4 is a rear elevation.

The top of the gear case has forward and rear pairs of spaced ears 34 and 35, by means of which the harvesting units are suspended from the frame in a manner that will presently be described. Beneath the rear of the gear case and secured thereto are a pair of downwardly extending spaced parallel pillars 36, located substantially directly to the rear of the forward extensions 33. The booms and pillars are preferably of skeletal construction, in the interest of lightness. Each boom carries at its outer end on the under side a block 37, forming the upper bearing for the vertical shaft 38 of a pulley 39, the lower bearing in a bracket 40, secured to said block. The brackets 40 are so disposed as to be between the flights of the belts which pass about said pulleys. The blocks 37 are slidably adjustable for tightening the belts, being mounted in guide tracks 41, shown in Figure 3, and adjusted by means of the screw 42, shown in Figure 5.

Each boom also carries, at an intermediate point, a block 43, supporting two spaced rods 44 which depend in a vertical direction and form axles about which the pulleys 45 and 46 rotate. The blocks 43 are transversely adjustable and the pulleys 45 and 46 are transversely arranged in said blocks. The adjusting mechanism is shown in Figures 8 and 9. The blocks 43 are slidable in guide tracks 47. Each block has a nut 48, non-rotatably mounted in a bore in said block and threaded upon a screw 49, which is prevented from moving axially by being journaled in a fixed lug 50 hugged by collars 51 on said screw at opposite sides of said lug. When the screw is turned, the nut 48, and with it the block 43, moves axially of said screw.

The pillars 36 each has a rearward extension 52 at an intermediate point in its length, providing an upper bearing for the drive shaft 53 of the pulley 54, and a rearward lower extension 55, which carries the lower bearing for said shaft. The pillars are between the flights of the belts that pass about the pulleys 54.

The belts 56 are shown in Figure 7, passing around the pulleys 39 and 54 with their inner and outer flights respectively bearing against the inner sides of the pulleys 46 and 45. The inner sides of the belts, that is, the unexposed sides, are provided with longitudinal, preferably V-shaped ribs 57, and the pulleys 39, 45 and 54 are provided with corresponding circumferential grooves 58, in which the ribs 57 travel. This prevents the belts from slipping downward on the pulleys.

The pulleys are so positioned with respect to ground level that the belts 56 travel in the zone of the bushy foliage portion of the celery belts. The belts form between them a longitudinal passage through which the celery belts pass as the harvester moves forward along the row. This passage has a flaring mouth convergent rearwardly as far as the throat determined by the pulleys 46. The foliage portion of the celery is embraced by the belts and progressively compacted until it reaches the throat which is the point of maximum compression, just in advance of the top cutting disks 59. If the belts were not revolving, the forward movement of the harvester would cause frictional engagement of the belts with the celery, to bend the celery in a forward direction. Therefore, the belts are driven, as will appear, in a direction to cause their inner flights to move rearwardly and preferably at the same speed as the forward movement of the vehicle, thus maintaining the celery upright.

The top cutting disks 59 are in advance of the root cutting disks 60, so that the celery is supported by its roots when the tops are cut off. The top cutting disks operate in a plane above the belts, and the root cutting disks in a plane below ground level.

The transverse adjustability of the pulleys 46 is for the purpose of varying the width of the throat of the passage between the belts 56, according to the size of the bushy portion of the celery belts which may vary according to variety, season, and other factors. To obtain uniform compactness in the bunching of the leaves by the belts in advance of the top cutting disks, the throat must be narrower for a sparse growth than for a more profuse growth of the foliage.

From the point in the length of the belts 56 at which the roots are severed, the inner flights of the belts act as a conveyor, carrying the trimmed stalks to the rear of the passage, at which point they are released and dropped upon the ground. The fact that the inner flights of the belts 56 show slightly divergent in Figure 7, is merely incident to the illustrated position of adjustment of the pulleys 46, which define a narrow throat. With a wider throat, said flights would be substantially parallel to the rear of said throat. In any position of adjustment the passage from the pulleys 46 to its rear end is sufficiently narrow to convey the trimmed stalks to the end of said passage before dropping them.

The rear ends of the booms 32 are each provided with a depending lug 61, to which is secured a downwardly extending bifurcated arm 62, carrying a coulter disk 63 at its lower end, journaled on a horizontal axis. The arm 62 passes between the flights of the belt 56 and the coulter disk is of such diameter as to extend below ground level and bridge the space between the ground and belt, the upper edge extending between the flights of the belt. The coulters 63 operate in advance of the root cutting disks. The coulters cut off the withered and dead stems lying upon the ground and the more mature and worthless stems which are so widely divergent on the plant as to be below the zone of foliage embraced by the belts.

The top cutting disks 59 are mounted at the lower ends of vertical shafts 64 and 65, the upper end portions of which pass through the gear case 31, being journaled in bearings in the upper and lower walls of said gear case. At an intermediate point, these shafts are supported by bearings 66, mounted at the rear ends of the booms 32. The root cutting disks are mounted in the lower ends of vertical shafts 67, the upper end portions of which are similarly mounted with respect to the gear case, as are the shafts 64 and 65, and the lower portions of which are journaled in bearings in forward extensions of the pillars 36 at the lower ends of the latter. Since the shafts 67 are relatively long, they preferably include an articulated middle section 69. This provides said shafts with a degree of flexibility which avoids the necessity for precise alignment of the bearings at the upper and lower ends of said shafts.

Within the gear case 31 is a driving train for the top and root cutting disks, comprising the relatively small gears 70 and 73 on the respective shafts 64 and 65, and the relatively large gears 71 and 72 on the shafts 67. The difference in size of the gears causes the top cutting disks to rotate faster than the root cutting disks. The gears are in series engagement, beginning with the gear 70, which is the drive gear, and assuming that the gear 70 turns clockwise, the top cutting disks rotate toward one another at the front, while the root cutting disks rotate away from one another at the front. The direction of rotation of the respective cutters causes the celery foliage to be gathered into the top cutting disks, and enables the root cutting disks to throw out any pebbles or other obstructions which they may encounter incident to their working beneath the surface of the ground.

At the top of the shaft 4 is the bevel gear 74, covered by a housing 75, and meshing within said housing with a gear 76 on a lay shaft 77, extending through a side of said housing and connected by a chain and sprocket drive 78, with a sprocket the hub 118 of which is slidably splined on a shaft 80, which is common to both harvesting units, and which shaft 80 is driven by a chain and sprocket connection 81, from the reduction gear 82 of the small engine 83, which is mounted on the frame 1 of the harvester. The sequence of driving connections from the common shaft 80 is identical for both harvesting units.

In order to conserve the cut off tops, a conveyor is provided for entraining them adjacent the point where they are severed, and carrying them to the rear of the harvesting unit separately from the trimmed stalks. This conveyor is constituted as follows. The rear extensions 52 of the pillars 36 project rearwardly of the bearings for the shaft 53, and carry spaced vertically aligned bearings 84, in which are journaled the shafts of the pulleys 85. At the same level and just above the top cutting disks 59, pulleys 86 are provided, fixed to the shafts 64 and 65 of the respective top cutting disks and driven by said shafts. Belts 87 pass around the respective pairs of pulleys 85 and 86, the inner flights of said belts cooperating to form a bottomless conveyor which frictionally carries the compacted tops to the rear of the harvesting unit to a point beyond that at which the trimmed stalks are dropped, so that the celery tops can be collected by a following vehicle or other receptacle placed beneath the rear of the tops conveyor without interfering with the releasing of the trimmed stalks at the rear of the belts 56 and the depositing of the same on the ground. The forward portions of the top cutting disks 59 serve as a table upon which the severed tops fall and from which they are entrained and carried off by the tops conveyor. The belts 87 are provided with the longitudinal ribs 88 and the pulleys 85 and 86, with the complementary grooves 89 for holding the belts in place.

The drive for the foliage compacting conveyor is obtained by means of pulleys 90 on the shafts of the top cutting disks and larger pulleys 91 on the shafts 53 of the pulleys 54, with belt connections 92 between said pulleys, the belts 56 being thus driven at a slower rate of speed than the top cutting disks.

The means for suspending the harvesting unit will now be described. A bell crank 93 is shown, comprising an elongated hub 94, extending transversely between the longitudinal frame members 13 and 15, having reduced ends 95 journaled in boxes 96, secured to the under sides of the respective frame members. At spaced points adjacent said frame members, and preferably equidistant therefrom, the hub 94 has a pair of parallel downwardly and rearwardly extending arms 97, secured thereto in the same phase of angular displacement, and an upwardly and rearwardly extending arm 98 which as shown in Figure 1 is in the same radial plane as the downwardly extending arm 97 which is adjacent to the frame member 13, and therefore conceals it in Figure 1, but this position of the arm 98 with respect to the arm 97 is merely incidental. The latter arm is shown in Figure 2.

The downward arms 97 are of equal length and perforated at their lower ends to receive the reduced ends of a rod 99, said rod bridging the space between said arms and being rigidly secured to said arms by means of nuts 100, as shown in Figure 6.

Forwardly of the bell crank 93 is an elongated hub 101, also extending transversely between the frame members 13 and 15, and having reduced ends 102 journaled in boxes 103, and having downwardly and rearwardly extending arms 104 secured thereto in the same angular phase, said arms being of the same length as the arms 97. The arms 104 are also perforated at their lower ends and support a transverse rod 105 similar to the rod 99 and similarly secured.

The ears 35 of the gear case which are longer than the ears 34, are hingedly mounted on the rod 99 and spaced apart a less distance than the length of the bridging portion of said rod and slidable thereupon. The ears 34 are hinged upon the rod 105 and have the same range of sliding movement as the ears 35.

When hydraulic pressure in the actuator 106 moves the plunger outwardly, the bell crank 98 rocks counterclockwise, lifting the harvesting unit which keeps parallel to its original position due to the parallelogram relationship of the turning points of the arms 97 and 104. In operation, only several inches of lift are required to adjust the root cutting disks which operate below but relatively close to the surface of the ground. Since the harvesting unit moves as a unit, the distance between the planes of operation of the top cutting and root cutting disks remains constant. When the vehicle is towed on a highway, it is necessary to lift the harvesting unit until the collars 63 are above the bottoms of the vehicle wheels.

Since there may be some difference in the distance between the rows of celery plants in different fields, the multiple row harvester illustrated in the drawings provides widthwise adjustment between the harvesting units. It has already been noted that the ears 34 and 35 are slidable upon the respective rods 105 and 99. In Figure 6 they are shown in mid-position on said rods and are retained in that position by collars 116, slidable on said rods and adjustably retained by set screws 117. By releasing the set screws the collars are released so that the harvesting units can be moved laterally toward one another for a narrow row spacing, or away from one another for wider spaced rows. The collars are then reset close to the ears to hold the harvesting units in their adjusted position.

Corresponding adjustment must be made of the sprockets, which are splined to the shaft 80, to put the driving connection between said shaft and the harvesting units in longitudinal alignment. The hubs 118 of the sprockets 79 have set screws 119 for fixing them in adjusted position.

The common drive shaft 80 for both harvesting units is journaled in boxes 108 mounted on the under side of juxtaposed transverse frame members 109 and 110, which extend between the adjacent longitudinal frame members and are secured thereto; see Figure 1. The boxes 108 are so positioned that a line drawn from the axis of the shaft 80 to the axis of the lay shaft 78 is parallel to the arms 104 and 97, and the length of said line is equal to the length of said arms, as will be clearly understood from Figure 2, so that the turning points of the suspending means and the axes of the shafts 80 and 77 have a parallel relationship. Therefore, the tension of the chain 78 will remain constant for any position of lift of the harvesting units.

The engine 83 is supported on the vehicle frame upon transverse bolsters 111, and Figure 1 shows that the unit 115 which incorporates the hydraulic pump and the tank for hydraulic fluid is supported upon a platform 112. The hydraulic pump is driven from the motor by a chain and sprocket connection 113. A clutch 114 intervenes between the gear reduction unit and the driving connections 113 and 81.

Since the motor unit and the hydraulic mechanism are purchased, and are not part of the present invention, a disclosure of their structure is not deemed essential except to the extent indicated in the diagrammatic showing in Figure 10.

The depth adjustment of each harvesting unit is independently controlled and the adjustment is hydraulically maintained until the operator changes it. Referring to Figure 10, a manual control handle 120 is provided for each harvesting unit. This operates a 4-way control valve in the housing 121. The pump which is continuously driven by the engine through the driving connection 113 is in a tank 123 less than full of hydraulic liquid, the line 124 representing the level of the liquid. The inlet 125 of the pump opens below liquid level. The discharge pipe 126 from the pump opens into the valve housing 121, and also has a relief valve 127, which opens in the tank below liquid level and is set to open at a relatively high pressure. When the handle 120 is in neutral position, the 4-way valve closes the end of the discharge pipe 126. The relief valve then opens and the circulation of the liquid by the pump is altogether within the tank from the relief valve to the inlet 125, as suggested by the arrow a. The pipes 128 and 129 open within the valve housing and respectively communicate with the cylinder of the actuator 126 on opposite sides of the actuator plunger 107. When the handle is in neutral position, either pipe 128 or pipe 129 is in communication through the 4-way valve with the exhaust pipe 31, which discharges into the body of liquid in the tank and is not under pressure.

When it is desired to move the actuator plunger outward, to lift the harvesting unit, the corresponding handle 120 is moved forwardly, operating the 4-way valve to put the pipe 128 in communication with the pressure discharge pipe 126, and the pipe 129 in communication with the exhaust pipe 130. The relief valve closes with the opening of the pipe 128 to the actuator. When the plunger has moved out to the desired point of lift, the handle is thrown to neutral, trapping the pressure back of the plunger. Build-up of pressure in the pipe 126 then causes the relief valve to reopen.

While I have in the above description of my invention disclosed what I now believe to be a preferred and practical embodiment of the same, it will be understood by those skilled in the art that the specific details of construction and arrangement of parts, as shown and described, are by way of example and not to be construed as limiting the scope of the invention.

What I claim as my invention is:

1. Celery harvester comprising a vehicle adapted to be tractor drawn, including a frame having vehicle wheels at its rear, a pair of harvesting units suspended from said frame in lateral relation, each harvesting unit including spaced side wall means defining a passage open at the bottom and ends for the longitudinal travel therethrough of standing celery, said side wall means being normally spaced from the ground and of such height as to engage the bushy part of the celery in an intermediate zone below the top, top and root cutting means positioned respectively above said passage and below ground level the root cutting means being to the rear of said top cutting means and at a fixed distance therefrom in a depthwise direction, said passage being sufficiently narrow to compact the embraced foliage portion in advance of said top cutting means, said harvesting units being laterally adjustable with respect to said frame to align said passages with differently spaced rows of celery.

2. Celery harvester as claimed in claim 1, including means for lifting said units with respect to said frame for varying the depth level of said root cutting means.

3. Celery harvester as claimed in claim 1, including means for lifting said units independently with respect to said frame for varying the depth level of said root cutting means.

4. Celery harvester comprising a vehicle adapted to be tractor drawn including a frame having vehicle wheels at its rear, a pair of harvesting units suspended from said frame in lateral relation, each harvesting unit including spaced side wall means defining a passage open at the bottom and ends for the longitudinal travel therethrough of standing celery, said side wall means being normally spaced from the ground and of such height as to engage the bushy part of the celery in an intermediate zone below the top, a pair of top cutting disks and a pair of root cutting disks respectively above said passage and below ground level, said root cutting disks being to the rear of said top cutting disks and at a fixed distance therefrom in a depth-wise direction, said passage being sufficiently narrow to compact the embraced foliage portion in advance of said top cutting disks, an engine carried by said frame, and driving connections from said engine to the top cutting disks and root cutting disks of both units, for driving the top cutting disks of each unit in such direction that the forward portions of said disks mutually approach and for driving the root cutting disks of each unit in such direction that the forward portions thereof mutually recede, and means for adjusting said harvesting units laterally with respect to said frame to align said passages with differently spaced rows of celery.

5. Harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulley, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vertical axes carried by and below said forward extensions to the rear of said front pulleys, engageable with the inner sides of said adjacent flights whereby the passage defined by said adjacent flights is rearwardly convergent up to the point of direction change determined by said idler pulleys and of approximately uniform narrow width from said point of direction change to its rear end, an engine mounted on said vehicle and driving connections from said engine to a pulley of each belt for driving said belts in such direction that said adjacent flights travel rearwardly.

6. Harvesting unit as claimed in claim 5, said belts being provided with continuous longitudinal ribs on their inner sides and said pulleys being provided with corresponding grooves in which said ribs run whereby said belts are prevented from slipping downward on said pulleys.

7. Harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulley and encompassing said downward extensions, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vertical axes carried by and below said extensions to the rear of said front pulleys, engageable with the inner sides of said adjacent flights whereby the passage defined by said adjacent flights is rearwardly convergent up to the point of direction change determined by said idler pulleys and of approximately uniform narrow width from said point of direction change to its rear end, an engine mounted on said vehicle and driving connections from said engine to a pulley of each belt for driving said belts in such direction that said adjacent flights travel rearwardly.

8. Harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulleys, the adjacent flights of said belts defining a passage open at the bottom and ends for the travel therethrough of standing celery, spaced from the ground and of such height as to engage the bushy part of the celery in a zone short of the top of the celery, a pair of narrowly spaced direction changing pulleys on vertical axes carried by and below said forward extensions to the rear of said front pulleys engageable with the inner sides of said adjacent flights whereby the passage defined by said adjacent flights is rearwardly convergent up to the point of direction change determined by said direction changing pulleys and of approximately uniform narrow width from said point of direction change to its rear end, means for adjusting said front pulleys longitudinally of said unit for tightening said belt, means for adjusting said direction changing pulleys transversely for varying the width of said passage at the point of direction change, an engine mounted on said vehicle and driving connections from said engine to a pulley of each belt for driving said belts in such direction that said adjacent flights travel rearwardly.

9. Harvesting unit as claimed in claim 8, including a pair of pulleys on vertical axes each unitarily associated with one of said direction changing pulleys, engageable with the outer sides of said outer flights of said belts and adjustable with said direction changing pulleys.

10. Harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulley, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vertical axes carried by and below said forward extensions to the rear of said front pulleys, engageable with the inner sides of said adjacent flights whereby the passage defined by said adjacent flights is rearwardly convergent up to the point of direction change determined by said idler pulleys and of approximately uniform narrow width from said point of direction change to its rear end, a pair of top cutting disks above said passage rearward of said idler pulleys, a pair of root cutting disks below said passage to the rear of said top cutting disks, parallel shafts to the lower ends of which said disks are secured, having their upper portions journaled in opposite walls of said gear case, serially connected gears on said shafts in said gear case, an engine mounted on said vehicle driving connections from said engine to one of said shafts and driving connections from certain of said shafts to a pulley of each belt for driving said belts in such direction that said adjacent flights travel rearwardly.

11. In a celery harvester a wheel supported vehicle frame, a pair of harvesting units suspended therefrom in lateral relation each having a frame comprising a gear case relatively flat in horizontal aspect, having forwardly divergent extensions from its forward end and spaced downward extensions from its rearward end, a pair of widely spaced pulleys on vehicle axes carried by and below the forward ends of said forward extensions, a pair of narrowly spaced rear pulleys on vehicle axes carried by said downward extensions in the same longitudinal zone as said front pulleys, a belt passing about each pulley and corresponding rear pulleys, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vehicle axes carried by and below said forward extensions to the rear of said front pulleys and engageable with the inner sides of said adjacent flights whereby the passage defined by said adjacent flights is rearwardly convergent up to the point of direction change, and of approximately uniform narrow width from said point to its rear end, a pair of rotary top cutting knives above said passage adjacent said point of direction change, a pair of rotary root cutting knives below said passage to the rear of said top cutting knives, parallel shafts to the ends of which said top and root cutting knives are secured having their upper portions journaled in opposite walls of said gear case, serially connected gears on said shafts in said gear case, a driving connection from certain of said shafts to a pulley of each of said belts, an engine mounted on said vehicle frame, a shaft on said vehicle frame common to said harvesting units, and driving means from said common shaft to one of said shafts of each unit.

12. In a celery harvester, a wheel supported vehicle frame adapted to be tractor drawn, a harvesting unit suspended from said vehicle frame comprising a frame, spaced side wall means carried thereby defining a longitudinal passage open at the bottom and ends for the travel therethrough of standing celery, said side wall means being normally spaced from the ground and of such height as to engage the bushy part of the celery in an intermediate zone below the top of the celery, and at least a portion of said passage being of such width as to compact the bushy part of the celery, top cutting means above said passage positioned to cut the celery in the region in which it is compacted, root cutting means rearwardly of said top cutting means, the suspending means for said harvesting unit comprising arms pivotally mounted on horizontal axes with respect to said vehicle frame at spaced longitudinal points, and pivotally connected on horizontal axes to said harvesting unit frame at equally spaced longitudinal points, the length of each arm being equal between its pivotal connections with said vehicle and harvesting unit frames, and means for swinging said harvesting unit longitudinally to adjust the depth of said root cutting means with respect to ground level, the axes of the pivotal connections of said arms with said frames being the corners of a parallelogram, whereby said harvesting unit swings without tilting.

13. In a celery harvester, a wheel supported vehicle frame adapted to be tractor drawn, a harvesting unit suspended from said vehicle frame comprising a frame, widely, transversely spaced front pulleys and narrowly, transversely spaced rear pulleys, on vertical axes, carried by said harvesting unit frame, a belt about each front and corresponding rear pulley driven by one of said pulleys the inner flights of said belts constituting a celery passage through said harvesting unit, intermediate pulleys on vertical axes carried by said harvesting unit frame, spaced apart approximately as narrowly as said rear pulleys, engaging the inner sides of the inner flights of said belts, rotary top and root cutting knives carried by said harvesting unit frame, said top cutting knives being adjacent the point of constriction of said passage determined by said intermediate pulleys, and said root cutting means being to the rear of said top cutting means, said passage being at such height above the ground as to engage the bushy foliage portion of the celery in an intermediate zone below the top of said foliage portion, said passage having an anterior portion rearwardly convergent to said point of constriction for compacting said foilage portion, and a posterior part to the rear of said root cutting knives for conveying the trimmed stalks to the rear of said passage, a driving train carried by said harvesting unit frame for rotating the top and root cutting knives and for operating said belts to move their inner flights rearward, said driving train terminating in a gear on said harvesting unit frame rotating on a horizontal axis, means for suspending said harvesting unit from said vehicle frame, said suspending means comprising arms pivotally mounted on horizontal axes with respect to the vehicle frame at spaced longitudinal points, and pivotally connected on horizontal axes to said harvesting unit frame at equally spaced longitudinal points, the length of each arm being equal between its pivotal connections with said vehicle and harvesting unit frames, means for swinging said harvesting unit longitudinally to adjust the depth of said root cutting means with respect to ground level, the axes of the pivotal connections of said arms with said frames being the corners of a parallelogram, whereby said harvesting unit swings without tilting, an engine mounted on said vehicle frame and a driving train from said engine to said gear on the harvesting unit frame, including a gear mounted on said vehicle frame rotating on a horizontal axis and a driving connection between said gears, the axes of said gears being positioned to form the corners of a parallelogram of which the pivotal connections of one of said arms with said vehicle frame and said harvesting unit frame are the other corners.

14. In a celery harvester, a vehicle frame supported by vehicle wheels and adapted to be drawn by a tractor, a harvesting unit suspended from said frame, each including celery foliage compacting means, top cutting means and root cutting means, said top and root cutting means being at a fixed distance apart in a depth direction, said suspending means comprising parallel spaced arms pivoted to said vehicle frame and to said harvesting unit frames, swingable in vertical longitudinal planes, the pivotal axes of said arms defining corners of a parallelogram whereby said harvesting unit swings without tilting, and means for adjustably swinging said unit for varying the depth of said root cutting means relative to the surface of the ground, means for driving said compacting means and top cutting means comprising a driving gear on said vehicle frame and a driven gear on said harvesting unit frame, said latter gear being operatively connected to said compacting and top cutting means, a driving connection between said gears, the axes of said gears being positioned to form the corners of a parallelogram of which the pivotal connections of one of said arms with said vehicle frame and said harvester unit frame, are the other corners.

15. In a celery harvester, a vehicle frame supported by vehicle wheels and adapted to be drawn by a tractor, a pair of harvesting units independently suspended in lateral relation from said frame each unit including celery foliage compacting means, top cutting means and root cutting means, said top and root cutting means being at a fixed distance apart in a depth direction, said suspending means comprising parallel spaced arms pivoted to said vehicle frame and to said harvesting unit frames, swingable in vertical longitudinal planes, the pivotal axes of said arms defining corners of a parallelogram whereby said harvesting units swing without tilting, and means for independently adjustably swinging said units for varying the depth of said root cutting means relative to the surface of the ground, means for driving said compacting means and top cutting means of each harvesting unit, comprising a driving gear on said vehicle frame and a driven gear on said harvesting unit frame, said latter gear being operatively connected to the compacting and top cutting means of its associated unit, a driving connection between said gears, the axes of said gears being positioned to form the corners of a parallelogram of which the pivotal connections of one of said arms with said vehicle frame and said harvesting unit frame, are the other corners.

16. In a celery harvester, a vehicle frame supported by vehicle wheels and adapted to be drawn by a tractor, a pair of harvesting units suspended in lateral relation from said frame, said units each including a frame carrying a pair of cooperating driven belts the inner flights of which constitute the rearwardly moving walls of a passage through said harvesting unit for the travel of standing celery, and driven top cutting and root cutting means, said suspending means for each unit includig longitudinally spaced pairs of laterally spaced arms, transverse rods secured to the lower ends of the arms of a pair in bridging relation between them, said arms being pivoted to said vehicle frame and said harvesting unit frame being pivotally connected to said transverse rods, all of said arms being parallel and the corresponding arms of each pair being swingable in parallel vertical planes, the pivotal axes of said arms in each vertical plane, with respect to said vertical frame and said harvesting unit frame, defining the corners of a parallelogram whereby said units can be lifted by swinging without tilting, an engine on said vehicle frame, a transverse drive shaft on said vehicle frame common to said units, driven from the engine, driving connections from said drive shaft to said units for operating the driven instrumentalities of said units, said units being laterally adjustable on said transverse rods, the driving connections from said drive shaft to said units including elements correspondingly slidably adjustable on said drive shaft, a hydraulic system including a pump operated by said engine, and hydraulic means in said system individual to said units for adjustably swinging them to vary the depth of said root cutting means relative to the surface of the ground.

17. Celery harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulley, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vertical axes carried by and below said forward extensions to the rear of said front pulleys, engageable with the inner sides of said adjacent flights whereby the passage defined by said adjacent flights is rearwardly convergent up to the point of direction change determined by said idler pulleys and of approximately uniform narrow width from said point of direction change to its rear end, a pair of top cutting disks above said passage rearward of said idler pulleys, a pair of root cutting disks below said passage to the rear of said top cutting disks, parallel shafts to the lower ends of which said disks are secured, having their upper portions journaled in opposite walls of said gear case, serially connected gears on said shafts in said gear case, pulleys on the shafts of said top cutting disks and driven thereby, positioned immediately above said top cutting disks, corresponding spaced pulleys carried by said downward extensions rearwardly beyond the ends of said celery passage, and belts extending above said pulleys on said top cutting disk shafts and said corresponding rearward pulleys, forming a conveyor to carry the cut tops to the rear of the harvesting unit, an engine mounted on said vehicle driving connections from said engine to one of said shafts and driving connections from certain of said shafts to a pulley of each belt for driving said belts in such direction that said adjacent flights travel rearwardly.

18. Harvesting unit comprising a frame, a vehicle from which said frame is suspended, said frame comprising a gear case relatively flat in horizontal aspect having forwardly divergent extensions from its forward end and spaced downward extensions from its rearward end, a pair of widely spaced front pulleys on vertical axes carried by and below the forward ends of said forward extensions, a pair of narrowly spaced rear pulleys on vertical axes carried by said downward extensions in the same longitudinal zone as said front pulleys, a belt passing about each front pulley and corresponding rear pulley, the adjacent flights of said belts defining a passage open at the bottom and ends for the travel therethrough of standing celery, spaced from the ground and of such height as to engage the bushy part of the celery in a zone short of the top of the celery, a pair of narrowly spaced idler pulleys on vertical axes carried by and below said forward extensions to the rear of said front pulleys, engageable with the inner sides of said adjacent flights whereby the passage defined by said adjacent flights is rearwardly convergent up to the point of direction change determined by said idler pulleys and of approximately uniform narrow width from said point of direction change to its rear end, brackets carried by said forward extensions to the rear of said idler pulleys extending downward between the flights of said belts, and coulters mounted on transverse axes in said brackets extending below ground level and bridging the space between ground and belts, an engine mounted on said vehicle and driving connections from said engine to a pulley of each belt for driving said belts in such direction that said adjacent flights travel rearwardly.

WILLARD C. SILVA.

REFERENCES CITED

The following references are of record in the file of this patent:

UNITED STATES PATENTS

| Number | Name | Date |
|---|---|---|
| 857,451 | Ehrlick | June 19, 1907 |
| 1,467,650 | Pond et al. | Sept. 11, 1923 |
| 2,420,500 | Shug | May 13, 1947 |

FOREIGN PATENTS

| Number | Country | Date |
|---|---|---|
| 163,239 | Great Britain | May 19, 1921 |